United States Patent [19]

Ott

[11] 3,969,105

[45] July 13, 1976

[54] TREATING AGENT FOR HIGH MELTING TEMPERATURE METALS

[75] Inventor: Jack J. Ott, Hemlock, Mich.

[73] Assignee: The Dow Chemical Company, Midland, Mich.

[22] Filed: Dec. 27, 1974

[21] Appl. No.: 537,048

[52] U.S. Cl. .......................... 75/53; 75/58; 75/130 A
[51] Int. Cl.² ..................................... C22C 33/08
[58] Field of Search .......... 75/53, 58, 130 A, 130 B, 75/130 R, 130 C

[56] References Cited
UNITED STATES PATENTS

| | | | |
|---|---|---|---|
| 2,563,859 | 8/1951 | Millis | 75/130 |
| 2,988,445 | 6/1961 | Hurum | 75/130 R |
| 3,393,996 | 7/1968 | Robertson | 75/53 |

*Primary Examiner*—Peter D. Rosenberg
*Attorney, Agent, or Firm*—R. W. Selby; J. M. Kuszaj

[57] ABSTRACT

An agent suitable to treat metals to, for example, desulfurize steel is disclosed. The treating agent is produced by coating a porous body with molten magnesium, oxidizing the magnesium coating and then impregnating the oxide coated porous body with magnesium.

17 Claims, No Drawings

TREATING AGENT FOR HIGH MELTING TEMPERATURE METALS

BACKGROUND OF THE INVENTION

This invention relates to treating agents for metals and more particularly to an alkaline earth metal containing agent suitable for treating metals with high melting temperatures.

It is well known that addition of metallic magnesium to molten metals with melting temperatures in excess of about 2000°F causes severe bubbling and splashing of the molten metals. This violent and hazardous reaction is undesirable for safety reasons. Additives for processes, such as desulfurization of iron and the nodularization of graphite in gray cast iron, have been developed which reduce the magnitude of the aforementioned violent reaction of magnesium with molten iron. Such additives are exemplified by porous coke, carbon, lime, silicon carbide and various briquetted or sponge-like forms of high melting temperature alloys which have been impregnated with molten magnesium. In U.S. Pat. No. 3,393,996 a porous body was impregnated with magnesium silicide by immersing the porous body into molten magnesium silicide and maintaining the body therein until the pores were substantially filled. The addition of the magnesium silicide containing porous body to molten cast iron causes a less violent reaction than the addition of porous bodies impregnated with magnesium metal.

U.S. Pat. No. 3,598,575 describes an iron treating inoculant coated with a refractory material to control the reaction of the inoculant in the molten iron. Iron skeletons were impregnated with magnesium in U.S. Pat. Nos. 2,563,859 and 3,364,976 to produce addition agents for the treatment of iron base melts.

SUMMARY OF THE INVENTION

It has been found that a porous body, such as iron or nickel sponge or briquetted particulate, with a melting temperature greater than that of magnesium, can be satisfactorily impregnated with magnesium by first coating the surface of the porous body with a layer of magnesium and then oxidizing at least a portion of the magnesium layer. At least a portion of the porous body with the magnesium oxide layer thereon is then impregnated by, for example, immersion into molten magnesium to form a magnesium impregnated porous body with at least a surface portion thereof coated with magnesium oxide. Surprisingly, the presence of the initial magnesium oxide layer does not prevent the penetration of molten magnesium into the interstices of the porous body and yet reduces the turbulence resulting from the addition of the impregnated body to, for example, molten iron. The impregnated treating agent is suitable for, for example, the desulfurization or nodularization of ferrous base metals.

DESCRIPTION OF THE PREFERRED EMBODIMENTS

In one embodiment of the present invention an iron or iron alloy body or sponge having interconnecting pores therein is exposed to a reducing atmosphere at a temperature of from about 1500° to about 1700°F. Generally, the sponge is maintained within this temperature range for at least about 0.5 hours; however, shorter times can also be employed when the sponge is contaminated with little organic matter. The so treated iron sponge is then at least partially and preferably substantially entirely coated with molten magnesium. The magnesium surface layer is then synthetically oxidized by exposure to an oxidizing atmosphere at an elevated temperature. Preferably the magnesium oxide layer is at least about 0.005 inch in depth. Subsequent submersion of the magnesium oxide coated sponge in molten magnesium results in substantially complete impregnation of the sponge with magnesium. Reproducability of the penetration of the iron sponge with magnesium is improved by exposure of the iron to the reducing atmosphere and also the presence of the magnesium oxide surface coating.

The magnesium oxide coated sponge iron is substantially entirely submerged in the magnesium for a sufficient time to, preferably, substantially entirely impregnate the pores within the sponge. Desirably the completed iron treating agent contains sufficient magnesium to provide a magnesium to iron weight ratio of from about 40 to about 60 parts magnesium to 1 part of iron. The completed iron treating agent retains the original porous magnesium oxide coating. This magnesium oxide coating on the final agent reduces the rate of dissolution and reactivity of the magnesium within the molten iron being treated.

To further illustrate the invention, sponge iron with interconnecting pores therein with an average size of about 0.002 inch diameter, was exposed in a reducing atmosphere, to a temperature of about 1700°F for ½ hour. The heated sponge was thereafter submerged in commercially pure molten magnesium, maintained at about 1200°F to 1225°F, for a sufficient time to coat substantially the entire exterior surface of the sponge. The surface coating of magnesium was oxidized rapidly at 1700°F. Thereafter the sponge was resubmerged in the magnesium melt for a sufficient time to substantially entirely fill the pores with magnesium. Upon removal of the impregnated sponge from the molten magnesium, the magnesium within the sponge iron was permitted to solidify. Examination of the impregnated sponge revealed an 0.01 inch thick oxidized magnesium surface layer and that substantially the entire interior portion of the sponge and oxide coating thereon had been impregnated with the magnesium. The magnesium containing sponge iron treating agent was submerged in molten steel and determined to be satisfactory for the desulfurization of steel.

Additional pieces of sponge iron (about one cubic inch in size) with pores up to about 0.01 inch diameter were filled with magnesium substantially as described in the hereinbefore example. The temperature of the molten magnesium generally ranged from 1200° to 1500°F, but the magnesium was also found to satisfactorily fill the pores in the sponge iron at a temperature of 1750°F.

What is claimed is:

1. A method of impregnating a porous body having interconnecting pores therein with magnesium comprising coating the surface of the body with a layer of magnesium, oxidizing at least a portion of the magnesium surface layer and then immersing at least a portion of the body with the oxide coating into molten magnesium to form a magnesium impregnated body with at least a portion of the surface coated with oxidized magnesium.

2. The method of claim 1 wherein the surface of the porous body is substantially entirely coated with a layer of magnesium oxide.

3. The method of claim 1 including the additional step of first exposing the body to a temperature of about 1500° to about 1700°F in a reducing atmosphere.

4. The method of claim 3 wherein the body is exposed in the reducing atmosphere for at least about 0.5 hours.

5. The method of claim 1 wherein the magnesium oxide layer is at least about 0.01 inch thick.

6. The method of claim 1 wherein the impregnated body contains iron and sufficient magnesium to provide a magnesium to iron weight ratio of from about 40 to about 60 parts of magnesium to 1 part of iron.

7. The method of claim 1 wherein the body is substantially entirely immersed in the molten magnesium.

8. An improved method of impregnating a porous iron body having a plurality of interconnecting pores with magnesium to provide a composite suitable as a desulfurizing agent in molten steel comprising sequentially immersing the porous iron body in molten magnesium for a sufficient time to at least partially coat the body surface with a layer of magnesium, oxidizing at least a portion of the magnesium layer, immersing the magnesium oxide coated body in molten magnesium for a sufficient time to substantially entirely impregnate the iron body with magnesium, removing the impregnated iron body from the molten magnesium and then solidifying the magnesium within the iron body to produce a magnesium oxide coated iron desulfurizing agent.

9. The method of claim 8 wherein substantially the entire iron body is coated with a layer of magnesium oxide.

10. The method of claim 9 including first exposing the iron body to a temperature of from about 1500° to about 1700°F in a reducing atmosphere.

11. The method of claim 10 wherein the body is exposed in the reducing atmosphere for at least about 0.5 hour.

12. The method of claim 10 wherein the impregnated iron body contains sufficient magnesium to provide a magnesium to iron weight ratio of from about 40 to about 60 parts of magnesium to 1 part of iron.

13. An agent for treating metals comprising a body with interconnecting pores filled with magnesium and coated with at least 0.005 inch thick layer of oxidized magnesium.

14. The method of claim 1 wherein the oxidizing step is carried out at an elevated temperature.

15. The method of claim 8 wherein the oxidizing step is carried out at an elevated temperature.

16. The method of claim 1 wherein the magnesium oxide layer is at least about 0.005 inch thick.

17. The agent of claim 13 wherein the layer of oxidized magnesium is at least about 0.01 inch thick.

* * * * *